(12) United States Patent
Johnson

(10) Patent No.: US 7,076,036 B1
(45) Date of Patent: Jul. 11, 2006

(54) TRAFFIC AND CAPACITY MODELING PROCESS

(75) Inventor: Douglas A. Johnson, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 278 days.

(21) Appl. No.: 09/981,461

(22) Filed: Oct. 17, 2001

(51) Int. Cl.
*H04M 15/00* (2006.01)

(52) U.S. Cl. .............. 379/112.06; 379/112.01; 379/112.05; 379/133

(58) Field of Classification Search ........... 379/111, 379/112.01, 112.05, 112.06, 114.28, 121.01, 379/126, 133, 134, 136, 137, 32.01
See application file for complete search history.

(56) References Cited

U.S. PATENT DOCUMENTS

| 5,555,295 | A | | 9/1996 | Bhusri |
| 5,610,915 | A | | 3/1997 | Elliott et al. |
| 5,768,352 | A | * | 6/1998 | Elliott et al. ......... 379/112.01 |
| 5,787,271 | A | | 7/1998 | Box et al. |
| 5,799,073 | A | * | 8/1998 | Fleischer, III et al. .. 379/112.01 |
| 5,872,911 | A | * | 2/1999 | Berg ..................... 714/43 |
| 5,937,042 | A | * | 8/1999 | Sofman ............... 379/112.05 |
| 5,999,604 | A | | 12/1999 | Walter |
| 6,052,447 | A | | 4/2000 | Golden et al. |
| 6,075,848 | A | * | 6/2000 | Lunn et al. ......... 379/112.01 |
| 6,137,775 | A | | 10/2000 | Bartlett et al. |
| 6,298,123 | B1 | * | 10/2001 | Nolting et al. .......... 379/111 |
| 6,385,301 | B1 | * | 5/2002 | Nolting et al. ........ 379/112.01 |
| 6,385,609 | B1 | * | 5/2002 | Barshefsky et al. ......... 707/6 |
| 6,421,435 | B1 | * | 7/2002 | Bastien et al. ............ 379/133 |
| 6,529,594 | B1 | * | 3/2003 | Brockman et al. ......... 379/133 |
| 6,728,352 | B1 | * | 4/2004 | Phillips et al. ........ 379/112.01 |

* cited by examiner

*Primary Examiner*—Quoc Tran

(57) ABSTRACT

A traffic and capacity modeling process for a telephone network includes accessing one or more call processing platforms, copying call detail records to a database, aggregating selected sets of call parameters from the records for each dialed number by hour, date, and platform, storing the aggregated sets of call parameters in tables, and analyzing the data in the tables. The analysis of the data includes plotting the data to detect peaks of usage of the dialed numbers to thereby assess the adequacy of available telephone lines and staffing of the lines by the network customers.

20 Claims, 5 Drawing Sheets

| DATE | DNIS | DURATION | ATTEMPTS | HOUR | PLATFORM |
|---|---|---|---|---|---|
| 01-SEP-00 | 800XXX3474 | 148757 | 387 | 00 | B |
| 01-SEP-00 | 800XXX3474 | 284941 | 670 | 00 | V |
| 01-SEP-00 | 800XXX3474 | 75434 | 228 | 01 | B |
| 01-SEP-00 | 800XXX3474 | 144065 | 351 | 01 | V |
| 01-SEP-00 | 800XXX3474 | 40943 | 125 | 02 | B |
| 01-SEP-00 | 800XXX3474 | 77886 | 182 | 02 | V |
| 01-SEP-00 | 800XXX3474 | 20060 | 91 | 03 | B |
| 01-SEP-00 | 800XXX3474 | 38537 | 133 | 03 | V |
| 01-SEP-00 | 800XXX3474 | 22667 | 87 | 04 | B |
| 01-SEP-00 | 800XXX3474 | 32101 | 115 | 04 | V |
| -- | -- | -- | -- | -- | -- |

FIG. 3.

TRAFFIC AND CAPACITY MODELING PROCESS

BACKGROUND OF THE INVENTION

The present invention relates to telecommunications management systems and, more particularly, to an enhanced traffic and capacity modeling process or tool for tracking traffic levels, and particularly traffic peaks, to facilitate planning for equipment and service growth.

Telecommunications facilitate the interactions which are necessary or desirable for many aspects of modern life, including business affairs, personal relationships, education, government functions, entertainment, and the like. Telephone systems function to establish a temporary electronic communication channel between a caller and a called party. A temporary communication channel, or call, is generally established between telephone lines of the communicating parties through "switches" which establish the particular channel and multiple line trunks which carry the communication signal between switches. The number of calls which can be simultaneously accommodated is limited by the number of switches and trunk lines available, that is, the total number of functioning switches and trunk lines in existence which are not currently occupied with calls or other "traffic".

Traffic on communication networks can include signals carrying actual vocal conversations between humans, as well as data such as communications among distributed computer systems, electronic financial transactions, facsimile signals, internet "surfing", email exchanges, network housekeeping data, and the like. New telecommunications technologies are emerging which will make further use of network throughput, such as on-line commerce, video teleconferencing, on-demand video entertainment, transmission of high quality medical images, remote control and monitoring applications, and the like.

Network traffic varies over time and date and by locality. Economics prevent network operators from providing even remotely sufficient capacity for all users to access the network simultaneously, since a large proportion of such capacity would be idle most of the time, constituting a wasted investment. In practice, telephone network operators attempt to provide adequate capacity to accommodate peak traffic, with some spare capacity to take care of unexpected traffic peaks, temporary local service outages, and short term growth. Operators of networks attempt to make the best use of existing capacity by efficient balancing of traffic loads through available switches and trunks by means of selective routing of calls. Because of the importance of activities supported by telecommunications and the volume of traffic, telecommunications network operators strive to maximize "up time" for components of the network as well as the technological quality of communication signals.

In the past, telephone network operators have typically analyzed usage data, derived from billing data, on a monthly basis for purposes of planning growth of infrastructure and service. Although a monthly accumulation of data has utility in planning service expansions and upgrades, the data does not show the volume of day-by-day traffic, much less hour-by-hour traffic peaks. A monthly total for a given customer does not show when, and to what extent, call peaks have occurred. At best, planners can make an educated guess at daily and hourly averages.

Certain types of businesses have high levels of incoming phone calls, such as companies which market products by telephone orders, companies which operate customer support services, certain government agencies, and the like. In order to effectively operate such services, such companies employ large numbers of phone lines to which are routed calls placed to one or more published telephone numbers, such as "800" type numbers. Such a technique is referred to as a dialed number identification service (DNIS). To serve their customers competitively, such companies may set answering goals, such that a customer's call will be answered within a certain number of rings. In order to meet such a goal, it is necessary to route the calls efficiently to available operators and to time the connection properly so that the customer's perception of prompt response is met. This further requires an adequate number of phone lines to handle the peak number of calls, an adequate number of operators properly trained, and call processing hardware and software.

The call processing hardware and software is most typically operated by a telephone network operator, or telephone company. Management of such calls is typically handled by a call processing "platform" which provides hardware for routing the calls and which records call data for billing purposes. The billing information is referred to as call detail records (CDR's) and, for toll-free type operations, include records of call attempts and usage minutes to each dialed number or DNIS. The CDR's are accumulated over a month for billing to the client company. In the past, capacity planning, both for the client company and for the telephone network, has been based on such monthly accumulations of recorded use. However, as explained above, a monthly record can be a very coarse tool on which to make planning decisions, since peak daily or hourly usage may greatly exceed a daily or hourly average of the month's usage.

SUMMARY OF THE INVENTION

The present invention provides a traffic and capacity modeling process which is capable of detecting hourly and daily peaks of usage of toll-free dialed numbers. The modeling process accesses call processing platforms and copies call detail records or CDR's into a CDR collection database. Periodically, such as once per day, the CDR collection database is processed to aggregate selected sets of CDR data fields or call parameters by DNIS for the date, hour, and call processing platform. The aggregated CDR parameters are then stored in tables for a period of time, such as a year or more, to enable access and analysis for planning purposes. Analysis of the aggregated CDR parameters may include graphic plotting, entry into spreadsheets, and the like. Of particular interest are the total number of attempts to call a particular DNIS per hour and the total usage minutes for a particular DNIS per hour. Variations in these parameters over time reveal peaks of usage of a given DNIS or dialed number and, thus, give a better indication of the adequacy of the number of lines, operators, and the like associated with a given DNIS than analysis based on conventionally monthly usage totals.

The aggregated CDR tables provided by the modeling process of the present invention can be made available for network operations purposes to allow planning for load balancing for expected peaks in calls by the hour, day, or season of the year and by location. For long term network planning, the aggregated CDR records provide accurate indications of peak call usage not only by time, but also by origin and destination of the calls. The information provided by the present invention can be used by telecommunications marketers to assist their client companies in optimizing their acquisition of equipment and services, as well as in allocating and training their personnel. Telecommunication network operators can also use the information provided by the present invention to optimize the performance of their equipment and operations.

The drawings constitute a part of this specification, include exemplary embodiments of the present invention, and illustrate various objects and features thereof.

BRIEF DESCRIPTION OF THE DRAWINGS

FIG. 3 is an exemplary table illustrating hourly call parameters of a selected dialed number created by the traffic and capacity modeling process.

DETAILED DESCRIPTION OF THE INVENTION

Figure 1:
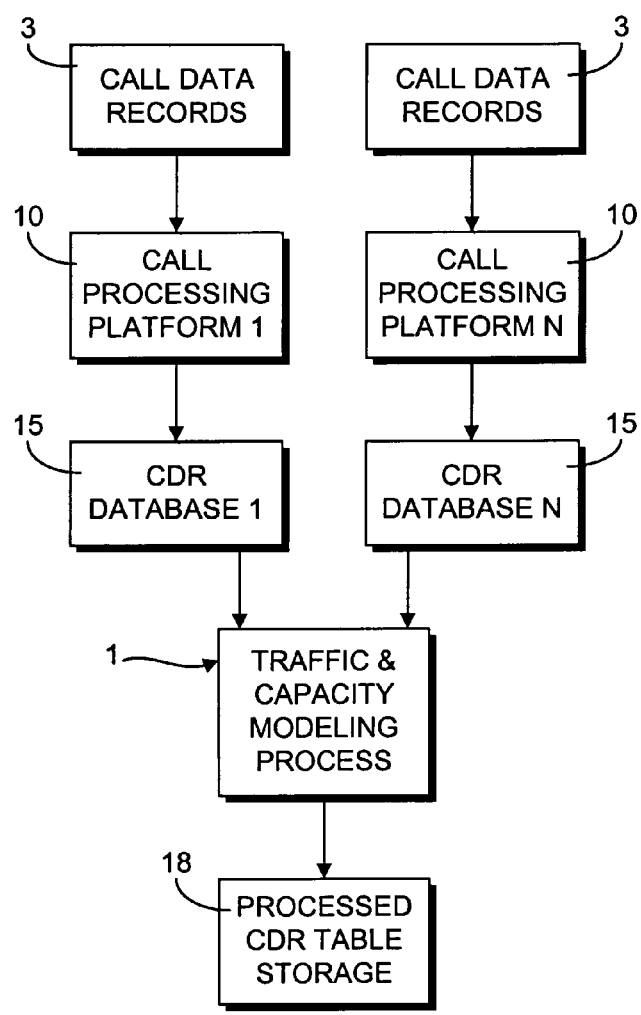
FIG. 1 is a simplified block diagram illustrating components involved in a traffic and capacity modeling process which embodies the present invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail:

The reference numeral 1 generally designates a traffic and capacity modeling process which embodies the present invention. The process 1 generally accumulates call detail records 3 and aggregates totals of selected call parameters generated over relatively short intervals of time for each DNIS or dialed number to thereby create tables of aggregated data by DNIS which can be meaningfully analyzed to assess the peak usages of such dialed numbers and the adequacy of equipment and personnel supporting and responding to calls to such dialed numbers.

The process 1 is particularly applicable to analyzing traffic patterns of calls to entities which make use of toll free numbers, such as "800" type numbers. Often, an entity, such as a marketing company or a customer support operation of a company, will publish an 800 XXX-XXXX number for inbound calls for merchandise orders or customer support assistance. Such a company will lease a number of telephone lines, and calls dialed to the published toll free number are routed to one of these lines on a first-available basis. Such a technique is referred to as a dialed number identification service or DNIS. A company using a DNIS pays for the number of lines in service and the total minutes of usage of the lines. To avoid lost sales, marketing companies try to avoid unanswered calls or busy signals. Thus, there is a necessary balance between the expenses of acquiring and staffing any number of incoming lines and the potential of lost sales if the call facilities are overloaded. The process 1 aids in achieving such a balance by providing tools to determine the times and levels of peak usage of DNIS operations.

Referring to FIG. 1, calls to DNIS numbers are handled by call processing platforms 10 which collect call parameters which are written to call detail records 3 or CDR's. Each platform 10 is a computer or system of computers executing proprietary software to accomplish its function, which is to collect the CDR's 3 for billing purposes. Either a single call processing platform or multiple platforms 10 can be employed depending on the volume of call traffic and the processing power of the particular platform 10.

The process 1 copies the CDR's 3 from the platforms 10 into a single database or multiple databases 15 which may be dedicated individually to the specific call processing platforms 10. Periodically, such as once a day, the databases 15 are accessed by the process 1 and selected call parameters of the CDR's 3 are aggregated according to DNIS by hour and platform and stored in aggregated tables 18. The aggregation of the CDR parameters into the tables 18 greatly compacts the storage volume that would be occupied by the original CDR's 3 and converts certain call parameters of interest to a form which is usable for assessing the levels of traffic through the DNIS numbers and the adequacy of response to the call traffic by the network customer.

Figure 2:
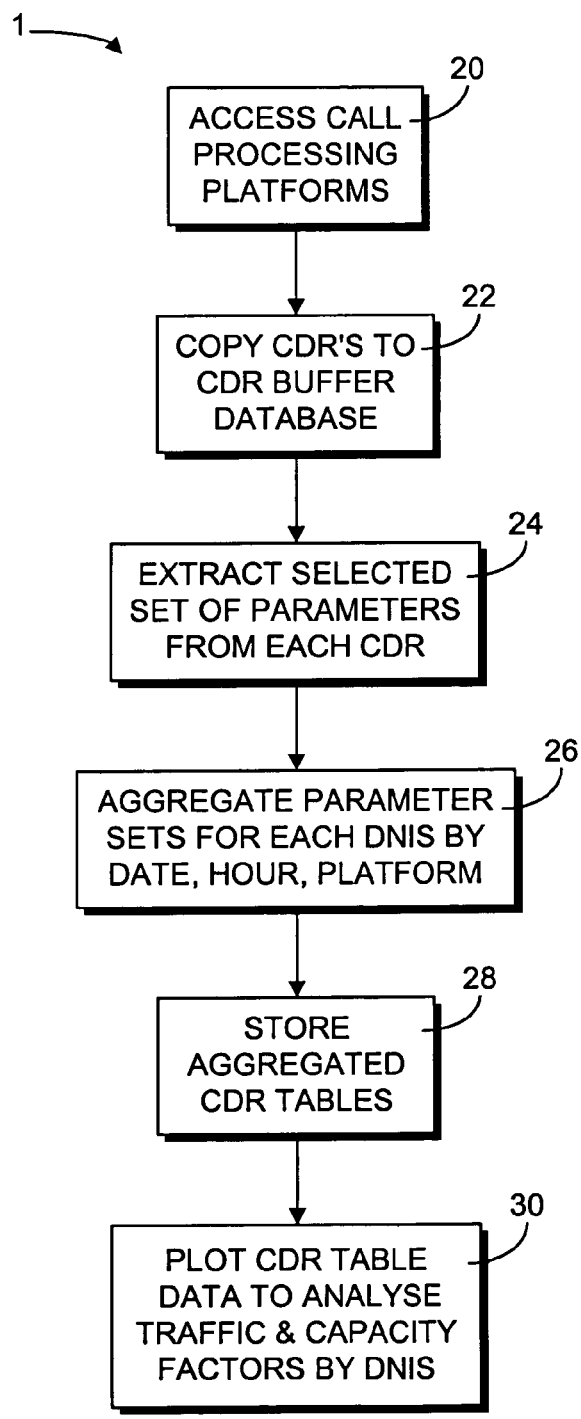
FIG. 2 is a simplified flow diagram illustrating principal steps of the traffic and capacity modeling process.

FIG. 2 summarizes the principal steps of the process 1 of the present invention. At step 20, the process 1 periodically accesses the call processing platforms 10 and copies the CDR's 3 to the CDR databases 15 at step 22. On a longer time cycle, preferably once a day, the process 1 extracts selected sets of call parameters from the CDR's 3 in the databases 15 at step 24 and, at step 26, aggregates the sets of call parameters for each DNIS by date, hour, and call processing platform 10. The process 1, thus, adds up the duration of each call and the total number of call attempts to each DNIS for a given hour, day, and platform 10. Alternatively, other call parameters could be aggregated. The aggregated sets of call parameters are stored in the tables 18 at step 28 and may be analyzed at step 30, as by graphically plotting variations in the parameters, entry into spreadsheets, or the like.

FIG. 3 illustrates an exemplary table 18 of aggregated call parameters for an exemplary DNIS 34, represented as (800) XXX-3474. The table 18 lists total duration 35 of accumulated calls to the DNIS 34 in minutes and the total number of attempts 37 to call the particular DNIS, by hour 39 and platform 41 throughout a particular date 43.

Figure 4:
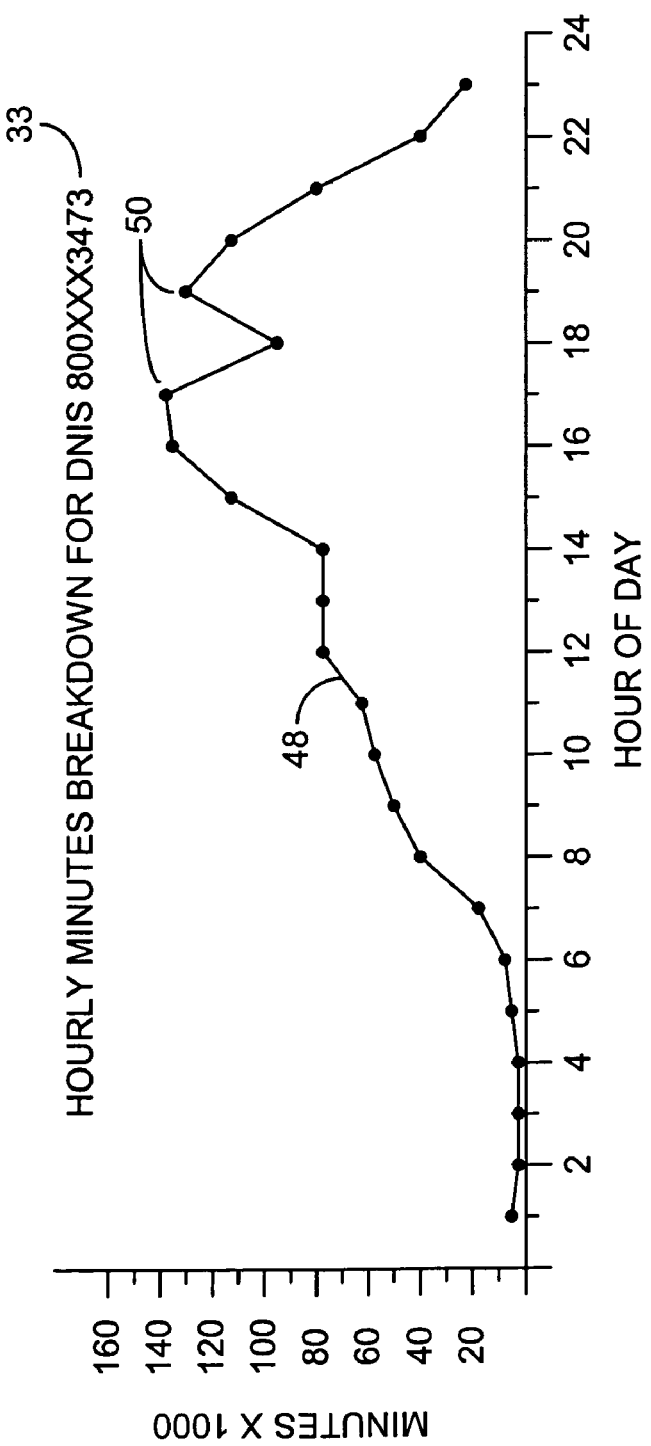
FIG. 4 is a line graph illustrating a variation of hourly usage minutes of a selected dialed number which was created using the traffic and capacity modeling process.

FIG. 4 illustrates a line graph with a curve 48 showing total duration of usage 35 of DNIS 33 by hour over a particular date, which is different from the date set shown in FIG. 3. The curve 48 dramatically indicates the variation of usage of DNIS 33 throughout the day. The traffic level diminishes during middle of the night hours, ramps up during the morning and afternoon hours, and peaks at 50 in the evening hours. A simple average based on a total month's usage of DNIS 33 would not detect the evening peaks 50. Phone lines leased and staffed based on a monthly average of usage of a DNIS 33 might be inadequate for the traffic peaks 50. The graphic analysis provided by the process 1 enables the network operator to accurately estimate the peak usage of a given DNIS, so that the network operator can more effectively market its products and services and so that a network customer can obtain adequate and economical levels of network services and staff them to handle the expected peaks of activity.

Figure 5:
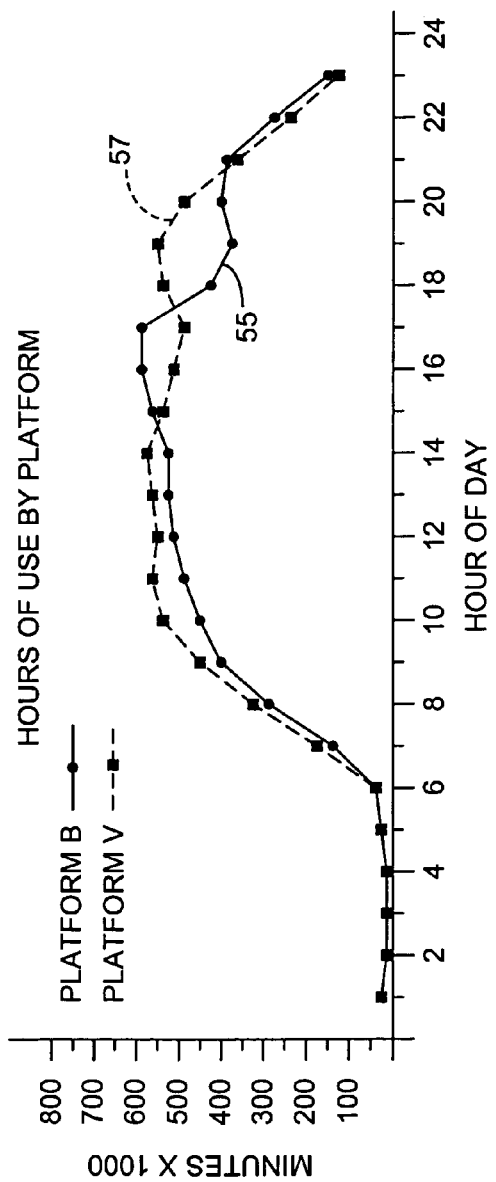
FIG. 5 is a line graph illustrating a comparison of hourly usage minutes for a pair of call processing platforms which was created using the traffic and capacity modeling process of the present invention.

FIG. 5 is a line graph illustrating a pair of curves 55 and 57 showing total duration of all calls processed by call processing platforms B and V by hour, throughout a day. The data plotted in FIG. 5 was generated using the process 1. The curves 55 and 57 show the variation in traffic by hour throughout a day. The process 1 can be used not only for analyzing the service needs of the network customers, but also for assessing the capacity and adequacy of network equipment, such as call processing platforms 10.

The tables 18 and other data generated by the process 1 is preferably archived for a period somewhat greater than a year. This allows comparisons of traffic levels for network customers and the network by hour, day, week, and month over an entire year and a complete cycle of seasons. This allows for long term planning of customer and network needs. The tables 18 and other data generated by the process 1 is much more compact and organized than the original CDR's 3, such that storage requirements are reduced. The tables 18 can be purged on a regular schedule to enable new data to be stored.

After some history of the data has been established using the process 1, usage patterns at the individual network customer and industry level will develop to allow a "what if?" analysis capability which marketing and capacity planning components of a network operator can use After the historical data is loaded, and DNIS and cyclical patterns have been established, the historical data can be used to forecast future customer needs. Most customers will fall into one of a limited number of customer profile segments. Such segments may include government service, help desk operations, insurance companies, colleges, and the like.

Because of this segmentation and with knowledge of the historical usage patterns, network marketing groups will have the ability to analyze a prospective customer's expected traffic volume with just a projected total monthly minutes and/or number of calls figure. The process 1 allows the customer to select a customer segment which best fits their industry, select an expected total monthly minutes or calls quantity along with a month-to-month growth pattern, and display a tabular or graphical representation of the expected: daily usage minutes by hour; daily calls by hour; and the expected daily usage pattern, complete with expected volume at a busy hour.

A network capacity planning group can apply this same analysis scenario, since traffic volumes by usage minutes can be effectively translated into network port requirements. Since the historical data depicts the platform ports and minutes available, a network marketing group can aggressively pursue customers whose expected calling patterns occur at non-peak times of the platforms. The process 1 also increases the efficiency of capacity planning efforts, since forecasted growth recognized at early time frames enables the acquisition of new and upgraded equipment in a timely fashion.

It is to be understood that while certain forms of the present invention have been illustrated and described herein, it is not to be limited to the specific forms or arrangement of parts described and shown.

What is claimed and desired to secure by Letters Patent is:

1. A process for analyzing telecommunication network traffic comprising the steps of:
   accessing call-processing platform;
   copying a call detail record from said call processing platform into at least one call detail database;
   periodically sorting the call detail record by dialed number;
   extracting a selected set of call parameters from said call detail record;
   aggregating said selected set of call parameters over intervals for each dialed number;
   storing said selected set of call parameters within at least one call parameter table; and
   comparing said selected set of call parameters with a projected change in customer traffic to forecast (i) required network resources and (ii) cost effectiveness based on said comparison.

2. The process of claim 1 wherein said extracting step comprises:
   extracting a duration of each call.

3. The process of claim 1 wherein said extracting step comprises:
   extracting an hour of day during which each call occurred.

4. The process of claim 1 wherein said extracting step comprises:
   extracting a date on which each call occurred.

5. The process of claim 1 wherein said aggregating step comprises:
   summing the total duration of all calls made during each hour of each day.

6. The process of claim 1 wherein said aggregating step comprises:
   summing the total number of calls made during each hour of each day.

7. The process of claim 1 comprising:
   detecting a maximum aggregated duration of calls within an hour for a selected day.

8. The process of claim 1 comprising:
   accessing a second call-processing platform;
   copying a call detail record for each call processed by said second platform;
   sorting the call detail record of said second platform;
   extracting a selected set of call parameters from said call detail record of said second platform; and
   aggregating said parameters of said second platform at intervals.

9. The process of claim 8 comprising:
   graphically plotting the selected call parameters of said first platform; and
   graphically plotting a second set of selected call parameters from a second
   platform to compare traffic capacity differences between said first and second platforms.

10. The process of claim 8 comprising:
    generating a table which includes a comparison of the selected call parameters of the first platform to the selected call parameters of the second platform; and
    using the table to compare traffic capacity differences between said first and second platforms.

11. The process of claim 8 comprising:
    determining the impact of projected traffic from a future customer on one of said first and second platforms.

12. The process of claim 8 comprising:
    comparing the selected call parameters of said first platform to the call parameters of said second platform to forecast the adequacy of network equipment.

13. A process for analyzing telecommunication network traffic comprising the steps of:
    accessing first and second call processing platforms;
    copying a call detail record for each call processed by each of said first and second platforms into a database;
    sorting the call detail records by platform;
    extracting a selected set of call parameters from each call detail record;
    aggregating said selected set of call parameters of said first and second platforms at intervals;

comparing said parameters of said first and second platforms with a projected change in customer traffic; and forecasting network resources required cost effectiveness based on at least one result of said comparing step.

14. The process of claim 13 wherein said extracting step comprises:

extracting a duration of each call;

extracting an hour of day during which each call occurred; and extracting a date on which each call occurred.

15. The process of claim 14 wherein said aggregating step comprises:

summing the total duration of all calls made during each hour of each day.

16. The process of claim 13 wherein said aggregating step comprises:

summing the total number of calls made to each dialed number during each hour of each day.

17. The process of claim 13 wherein said analyzing step comprises:

graphically plotting the selected call parameters of the first platform; and graphically plotting the selected call parameters of the second platform to compare traffic capacity differences between said platforms.

18. The process of claim 13 wherein said analyzing step comprises:

generating a table which includes a comparison of the selected call parameters of the first platform to the selected call parameters of the second platform; and using the table to compare traffic capacity differences between the platforms.

19. The process of claim 13 wherein the analytical step comprises:

determining the impact of projected traffic from a future customer on one of said first and second platforms.

20. The process of claim 13 wherein the analytical step comprises:

comparing the selected call parameters of said first platform to the call parameters of said second platform to forecast the adequacy of network equipment.

* * * * *